US008601554B2

(12) United States Patent (10) Patent No.: US 8,601,554 B2
Gordon et al. (45) Date of Patent: Dec. 3, 2013

(54) HOME REALM DISCOVERY IN MIXED-MODE FEDERATED REALMS

(75) Inventors: Ariel Gordon, Kirkland, WA (US); David J. Nicholson, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 92 days.

(21) Appl. No.: 13/293,054

(22) Filed: Nov. 9, 2011

(65) Prior Publication Data

US 2013/0117826 A1 May 9, 2013

(51) Int. Cl.
*G06F 7/04* (2006.01)
*H04L 9/32* (2006.01)

(52) U.S. Cl.
USPC ................................ 726/5; 726/27; 713/169

(58) Field of Classification Search
USPC ........................................ 726/5, 27; 713/169
See application file for complete search history.

(56) References Cited

U.S. PATENT DOCUMENTS

| 7,266,693 B1 * | 9/2007 | Potter et al. ................... 713/169 |
| 2003/0065940 A1 * | 4/2003 | Brezak et al. ................. 713/201 |
| 2006/0185021 A1 * | 8/2006 | Dujari et al. ..................... 726/27 |
| 2008/0104244 A1 | 5/2008 | Chen et al. |
| 2010/0299313 A1 | 11/2010 | Orsini et al. |

OTHER PUBLICATIONS

Zhang, G., Fischer-Hübner, S., Martucci, L. A., & Ehlert, S. (Mar. 2009). Revealing the calling history of SIP VoIP systems by timing attacks. In Availability, Reliability and Security, 2009. ARES'09. International Conference on (pp. 135-142). IEEE.*

"Microsoft Office 365: Make a Smooth Move to the Cloud", Published on: Mar. 2011, Available at: http://technet.microsoft.com/en-us/magazine/gg675925.aspx.

Li, et al., "Identity-based Authentication for Cloud Computing", In Proceedings of the 1st International Conference on Cloud Computing, 2009, pp. 157-166.

"PasswordBank Transforms Identity Federation in Enterprises", Published on: May 5, 2011, Available at: http://www.prweb.com/releases/2011/5/prweb8378054.htm.

Chow, et al., "Authentication in the Clouds: A Framework and its Application to Mobile Users", In Proceedings of the 2010 ACM workshop on Cloud Computing Security Workshop, Oct. 8, 2010, 6 pages.

Thangavel, et al., "Efficient Secured Hash based Password Authentication in Multiple Websites", In International Journal on Computer Science and Engineering, vol. 2, Issue 5, 2010, pp. 1846-1851.

* cited by examiner

*Primary Examiner* — Carl Colin
*Assistant Examiner* — S. Ali Zaidi
(74) *Attorney, Agent, or Firm* — Workman Nydegger

(57) ABSTRACT

The authentication of identities within a realm in which some identities are authenticated using direct authentication, and some identities are authenticated using federated authentication. Requests for service from valid identities in the realm that are to be authenticated by direct authentication are responded to with a direct authentication interface. Requests for service from valid identities in the realm that are to be authenticated by federated authentication are responded to with a federated authentication interface. Requests for service from invalid identities are responded to pseudo-randomly with either the direct authentication interface or the federated authentication interface.

17 Claims, 5 Drawing Sheets

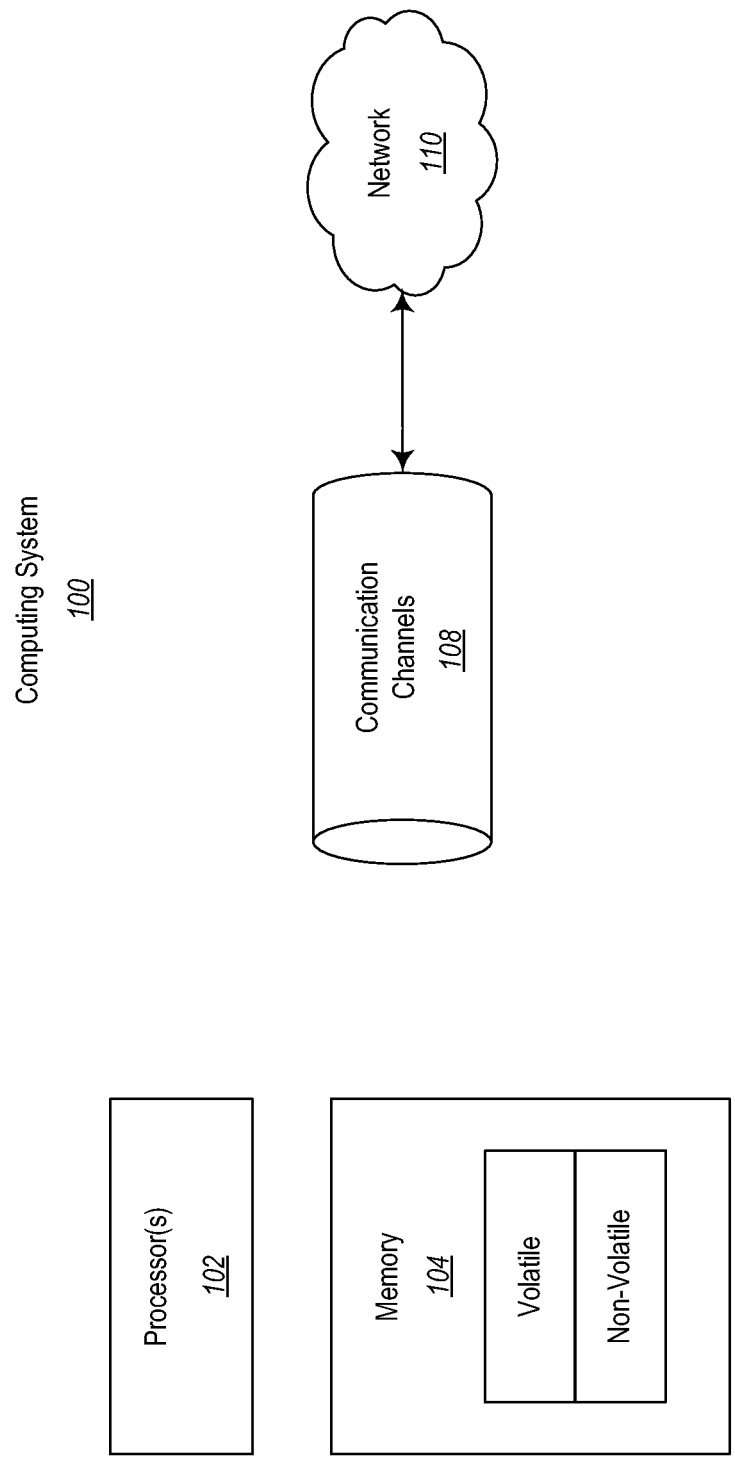

HOME REALM DISCOVERY IN MIXED-MODE FEDERATED REALMS

BACKGROUND

When an application or service provider provides a service to a client or its user, it is often necessary to authenticate the client and/or user. Authentication involves proving to the satisfaction of the relying party (the application or service provider) that the requester is who the requester purports to be.

Some authentication is direct authentication in which the requester interfaces directly with the relying party in order to prove the requester's identity. For instance, the requester might provide a user name and password, that is known to the requester and relying party, but which would be difficult for a third party to guess.

Some authentication is federated authentication in which the relying party directs the requester to a third party identity provider that the relying party trusts. The requester negotiates with the identity provider until the requester is authenticated to the identity provider. The identity provider then provides tamper-resistant credentials to the requester claiming proper authentication. The requester provides these credentials to the relying party, which interprets them as stating that the identity provider has authenticated the requester. Given the trust that exists between the relying party and the identity provider, the relying party may likewise consider the requester as authenticated.

BRIEF SUMMARY

At least one embodiment described herein relates to the authentication of identities within a realm in which some identities are authenticated using direct authentication, and some identities are authenticated using federated authentication. Such a realm might be identified by, for example, a namespace such as an Internet domain name owned by an organization. Requests for service from valid identities in the realm that are to be authenticated by direct authentication are responded to with a direct authentication interface. Requests for service from valid identities in the realm that are to be authenticated by federated authentication are responded to with a federated authentication interface. Requests for service from invalid identities are responded to pseudo-randomly with either the direct authentication interface or the federated authentication interface.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which:

FIG. 1 illustrates an example computing system that may be used to employ embodiments described herein;

DETAILED DESCRIPTION

Figure 2B:
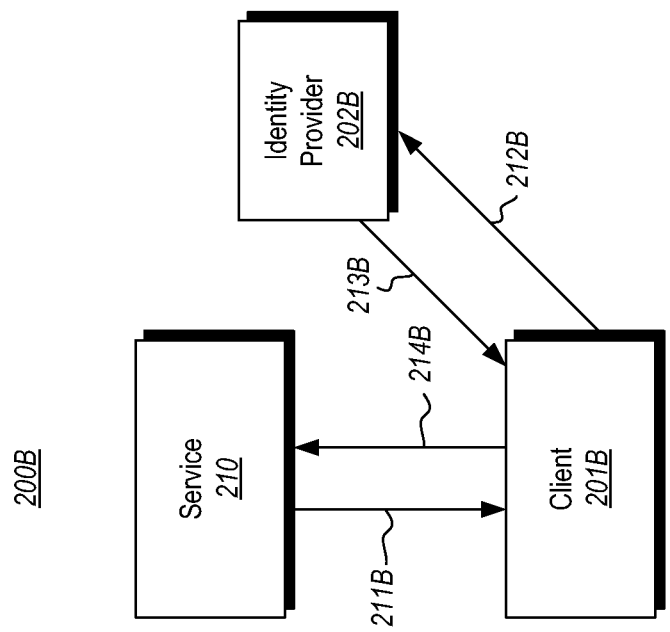
FIG. 2B illustrates a process in which a client authenticates to a service using federated authentication.

In accordance with embodiments described herein, the authentication of identities within a realm is described in which some identities are authenticated using direct authentication, and some identities are authenticated using federated authentication. Requests for service from valid identities in the realm that are to be authenticated by direct authentication are responded to with a direct authentication interface. Requests for service from valid identities in the realm that are to be authenticated by federated authentication are responded to with a federated authentication interface. Requests for service from invalid identities are responded to pseudo-randomly with either the direct authentication interface or the federated authentication interface.

In some embodiments, the response timing is approximately the same regardless of whether the request is from a valid or invalid identity. Furthermore, the assignment of federated or direct authentication interfaces to invalid identities may be made deterministically based on identity, and approximately in proportion to the distribution of direct and federated authentication amongst valid identities. First, some introductory discussion regarding computing systems will be described with respect to FIG. 1. Then, the embodiments of the authentication will be described with respect to FIGS. 2 through 5.

First, introductory discussion regarding computing systems is described with respect to FIG. 1. Computing systems are now increasingly taking a wide variety of forms. Computing systems may, for example, be handheld devices, appliances, laptop computers, desktop computers, mainframes, distributed computing systems, or even devices that have not conventionally been considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "module" or "component" can refer to software objects or routines that execute on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 104 of the computing system 100. Computing system 100 may also contain communication channels 108 that allow the computing system 100 to communicate with other message processors over, for example, network 110.

Embodiments described herein may comprise or utilize a special purpose or general-purpose computer including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer. In this description and in the claims, a "computer program product" includes one or more computer storage media having computer-executable instructions thereon that, when executed by the one or more processors of the computing system, perform the function of the computer program product.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 2A:
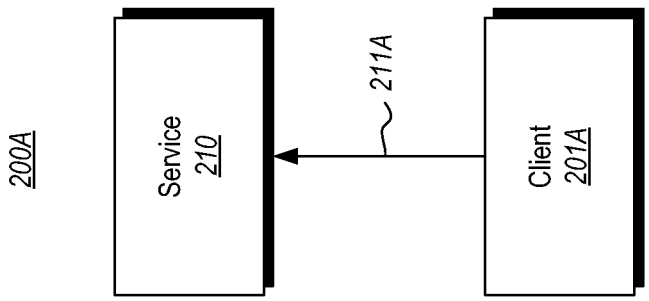
FIG. 2A illustrates a process in which a client authenticates to a service using direct authentication.

FIG. 2A illustrates an environment 200A in which a client computing system 201A interfaces with a service 210 to perform direct authentication. The service 210 may be located remotely from the client computing system 201A, but might also be located local to the client computing system 201A, or may even be running on the computing system 201A. In direct authentication, the client computing system 210A directly negotiates and provides (as represented by arrow 211A) credentials to the service 210 (also called a "relying party") to prove to the service's 210 satisfaction that the client computing system 201A has an identity it purports to have.

FIG. 2B illustrates an environment 200B in which a client computing system 201B interfaces with a service 210 to perform federated authentication by being redirected to an identity provider 202B to perform the authentication. Once again, the service 210 may be located remotely from the client computing system 201B, but might also be located local to the client computing system 201B, or may even be running on the client computing system 201B.

In federated authentication, after receiving a request for service from the client computing system 201B, the service 210 provides a redirection instruction (as represented by arrow 211B), causing the client computing system 201B to authenticate with the identity provider 202B (as represented by arrow 212B). In response thereto, the identity provider 202B provides credentials to the client computing system 201B (as represented by arrow 213B), causing the client computing system 201B to provide such credentials to the service 210 (as represented by arrow 214B). Since the credentials are resistant to tampering, the service 210 then interprets the credentials as representing that the identity provider 202B vouches for the stated identity of the client computing system 201B. Further, since the service 210 trusts the identity provider 202B, the service 210 may thereby consider the client computing system 201B authenticated.

In some embodiments, the third-party identity provider may be an enterprise identity provider such as an Active Directory Federated Services (ADFS) service. In some embodiments, the third-party identity provider may be a consumer identity provider such as YAHOO, GOOGLE, FACEBOOK, TWITTER, WINDOWS LIVE ID, and so forth.

The client computing systems 201A and 201B may each be structured as described above for the computing system 100 of FIG. 1. Client computing systems may hereinafter be referred to as "clients" for short. Furthermore, the service 210 may be implemented on a computing system such as the computing system 100 of FIG. 1. As an example, the service 210 may be implemented by the computing system (such as computing system 100) accessing a computer program product that includes one or more computer readable media (such as computer storage media) having thereon computer-executable instructions that are structured such that, when executed by one or more processors (e.g., processor(s) 102) of the computing system, cause a service 210 to be created and operated as described herein.

Figure 3:
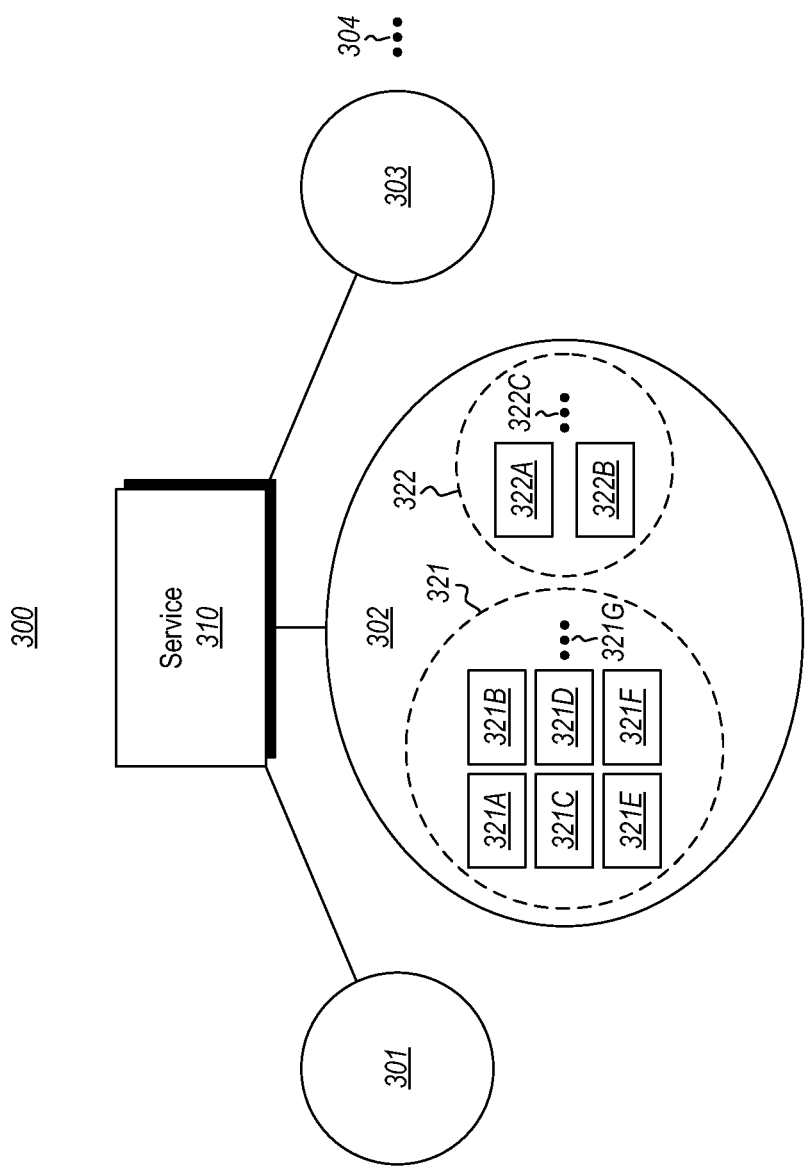
FIG. 3 illustrates an environment in which a service may respond to service requests from clients from various realms.

FIG. 3 illustrates an environment 300 that includes a service provider or application (referred to collectively as "service 310"), which may be, for example, the service 210 of FIGS. 2A and 2B, and may be capable of authenticating client identities using both direct authentication and federated authentication. The environment 300 also includes multiple realms 301, 302 and 303. A realm is a set of one or more criteria. Entities which satisfy the criteria (hereinafter also referred to as "membership criteria") may be said to be members of the realm. As an example, the realm might be a particular namespace, in which the criteria for membership is simply that the entity fall within the namespace. An example of a namespace is an Internet domain name, in which entities that are named within the Internet domain name are members of that realm. In some embodiments, the realms 301, 302 and 303 may be of equivalent structure. For instance, each of the realms 301, 302 and 303 may be a namespace, or each realm 301, 302 and 303 may be an Internet domain name. The ellipses 304 represent that there may be many realms (each corresponding to many different realms, whose constituent members (e.g., clients) interact with the service 310 to obtain its services). The various clients within the realms may make service requests upon the service 310 for which the identity of the client are first authenticated before the service is provided. The clients of each of the illustrated realms have valid identities.

Although not shown, invalid identities may also be provided to the service 310 in cases in which malicious or errant individuals attempt to illicitly obtain the services of service 310, pretending to be a valid member of the realm. Since the number of invalid identities that may be provided to the service 310 is limited only by the imagination of their creators, the number of false identities that could be provided to the service 310 may likewise have practically no limit.

Realm 301 includes multiple clients (not shown), each having a valid identity that satisfy the set of one or more criteria associated with the realm 301. There may also be invalid identifiers that are considered within the realm 301 by virtue of their satisfying the criteria, but are considered invalid because the identifiers are not recognized by the service 310. The first realm 301 is a direct authentication realm in which each member identity will be subject to direct authentication. For instance, the realm 301 may be a first domain name that includes identifiers (valid and invalid) within that first domain name. FIG. 2A illustrates the process of direct authentication. The service 310 may authenticate any of the client identities associated with the first realm using the direct authentication.

Realm 303 includes multiple clients (not shown), each having a valid identity that satisfy the set of one or more criteria associated with the third realm 303. There may also be invalid identifiers that are considered within the realm 303 by virtue of their satisfying the criteria of the realm 303, but are considered invalid because the identifiers are not recognized by the service 310. The third realm 303 is a federated authentication realm in which each member identity will be subject to federated authentication. For instance, the realm 303 may be a third domain name that includes identifiers (valid and invalid) within that third domain name. FIG. 2B illustrates the process of federated authentication. The service 310 may authenticate any of the client identities associated with the third realm using the federated authentication.

Realm 302 includes multiple clients, each having a valid identity that satisfies one or more criteria for membership within a second realm 302. The second realm 302 is a mixed authentication realm that 1) includes clients that have direct authentication identities 321 that are to be authenticated to the service 310 using direct authentication such as the direct authentication of FIG. 2A, and 2) includes clients that have federated authentication identities 322 that are to be authenticated to the service 310 using federated authentication such as the federated authentication of FIG. 2B. There might also be invalid entities that are members of the realm 302 by virtue of satisfying the membership criteria of the realm 302, but which are invalid because they are not recognized by the service 310. For instance, the realm 302 may be a second domain name that includes identifiers (valid and invalid) within that second domain name.

For instance, the direct authentication identities 321 are illustrated as including six identities 321A through 321F, although the ellipses 321G represent that there may be other numbers, and potential many more, of such direct authentication identities. Likewise, the federated authentication identities 322 are illustrated as including two identities 322A and 322B, although the ellipses 321C represent that there may be other numbers, and potential many more, of such federated authentication identities. As mentioned above, realm 301 includes only direct authentication identities and thus might be of equivalent structure as realm 302, except in which case the federated authentication identities set 321 is empty. Likewise, realm 303 includes only federated authentication identities and thus might be of equivalent structure as realm 302, except in which case the direct authentication identities set 322 is empty. Often, a realm (such as a domain name), may include thousands or millions of constituent valid identities, but very small numbers (such as zero, one or two) of valid identities are also possible.

Figure 4:
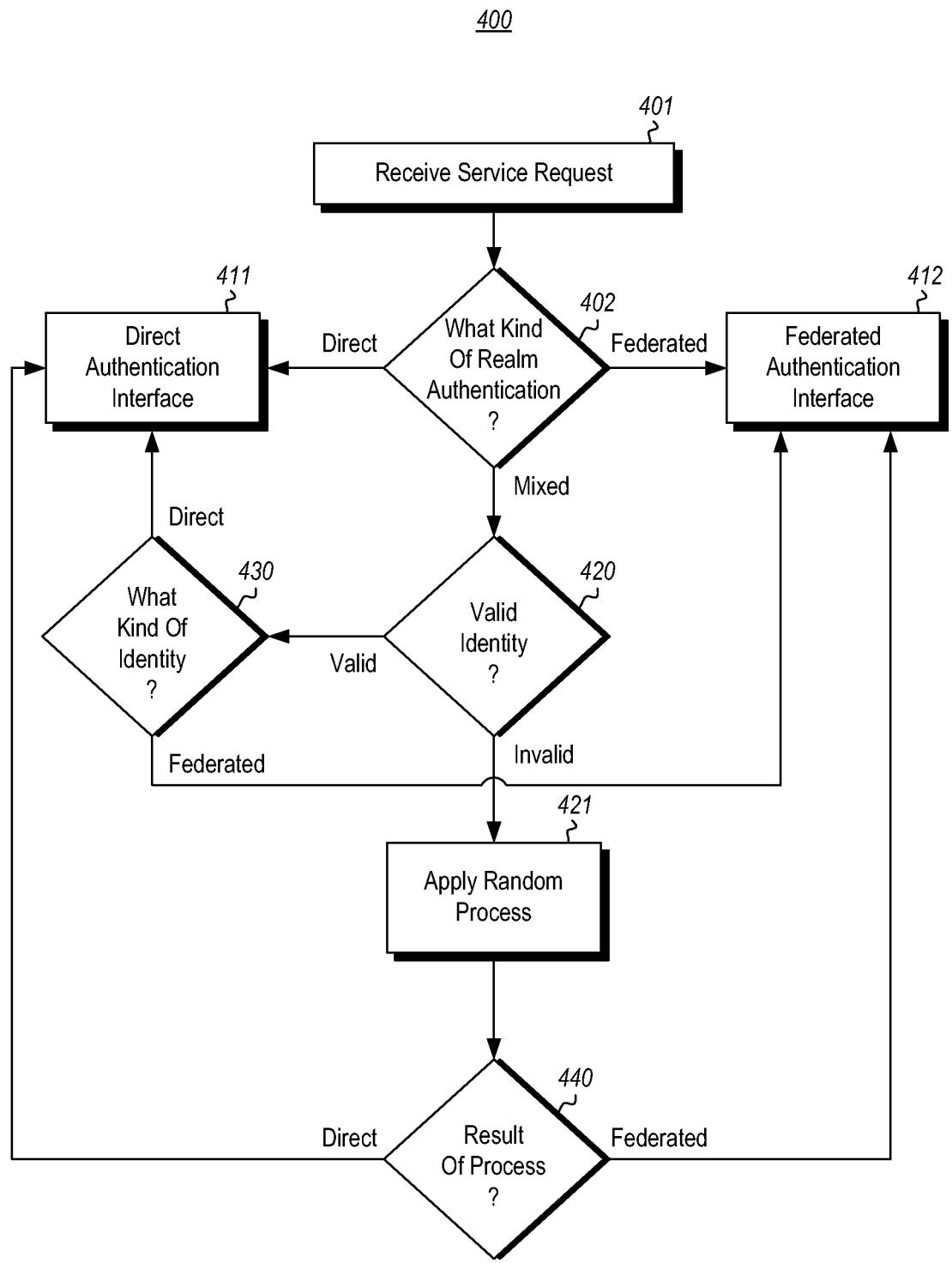
FIG. 4 illustrates a flowchart of a method for authenticating identities within a realm.

FIG. 4 illustrates a flowchart of a method 400 for authenticating identities within a realm. As the method 400 may be performed in the environment 300 of FIG. 3, the method 400 of FIG. 4 will now be described with frequent reference to the environment 300 of FIG. 3.

The method 400 is initiated upon receiving a request for a service from an identity (valid or invalid) within a realm (act 401). Referring to FIG. 3, the service 310 could receive a request from any of the clients having valid identities within realms 301, 302, 303, or 304, or may even receive a request from an invalid entity that is not illustrated in FIG. 3.

The service then determines what kind of authentication applies to the realm associated with the request (decision block 402). If the realm is a direct authentication realm ("Direct" in decision block 402), the service 310 causes a direct authentication interface (act 411) to be presented on the requesting client. This interface might, for example, allow the user to enter a username and password, or might otherwise allow the user to select appropriate credentials and provide such credentials directly to the service, allowing the service to authenticate the valid identity of the client in accordance with the direct authentication of FIG. 2A. For instance, referring to FIG. 3, if the service 310 receives a request from any client that asserts an identity (valid or otherwise) with the realm 301, then the client is presented with a direct authentication interface.

If the realm is a federated authentication realm ("Federated" in decision block 402), the service 310 causes a federated authentication interface (act 412) to be presented on the requesting client. This interface might, for example, be an interface provided by the third party identity provider in response to a redirection instruction from the service 310. Referring to FIG. 2B, this would allow the client 201B to interface with the third party identity provider 202B to receive authentication credentials from the third party identity provider 202B and provide such credentials to the service 210. Referring to FIG. 3, if the service 310 receives a request from any client that asserts an identity (valid or otherwise) with the realm 303, then the client is presented with a federated authentication interface (act 412).

If the realm is a mixed authentication realm ("Mixed" in decision block 402), then some of the valid identities within the realm are direct authentication identities and some of the valid identities within the realm are federated authentication identities. For instance, in the mixed authentication realm 302 of FIG. 3, some of the identities 321 are direct authentication identities and some of the identities 322 are federated authentication identities. There may also be some invalid identities that happen to satisfy the membership criteria for the mixed realm, but which are nonetheless not recognized as valid by the service.

Accordingly, the method 400 then proceeds to determine whether the identity associated with the mixed realm is a valid identity (decision block 420). If the identity is a valid identity ("Valid" in decision block 420), this means that the identity exists in the mixed realm, and is recognized by the service, even though the requester has not yet been authenticated as being associated with that valid identity.

If the identity is valid, then the service 310 determines what kind of identity the valid identity is (decision block 430). If the valid identity is a direct authentication identity ("Direct" in decision block 430), then the direct authentication interface is presented on the client (act 411). For instance, in FIG. 3, if the service 310 receives a request from the valid direction authentication identity 321A, then the client associated with the identity 321A is presented with the direct authentication interface.

If the valid identity is a federated authentication identity ("Federated" in decision block 430), then the federated authentication interface is presented on the client (act 412). For instance, in FIG. 3, if the service 310 receives a request from the federated authentication identity 322A, then the client associated with the valid federated authentication identity 322A is presented with the federated authentication interface.

If, on the other hand, the identity associated with the request, and within the mixed realm is an invalid identity ("Invalid" in decision block 420), this means that although the realm is valid, the invalid identity associated with the request is not a recognized identity of the realm. For instance, in FIG. 3, perhaps the service receives a request that includes an identity that satisfies the membership criteria of the realm 302 but is not one of the valid identities 321 or 322 that are recognized by the service 310.

In the case of the requester providing an invalid identity ("Invalid" in decision block 420), the requester is still provided with an authentication experience so as not to reveal to the potentially malicious requester that the identity is invalid. If such information were revealed, the potentially malicious requester may repeat such a request to identity a set of valid identities by a brute force attack.

To provide an authentication experience to the requester that provided the invalid identity, the service applies a pseudo random process (act 421). If the results of the pseudo random process correspond to a direct authentication ("Direct" in decision block 440), the requester is provided with a direct authentication interface (act 411). On the other hand, if the results of the pseudo random process correspond to a federated authentication ("Federated" in decision block 440), the requester is provided with a federated authentication interface (act 412).

Accordingly, the requester that provides the invalid identity is not provided with an error message that immediately indicates that the identity is invalid. Rather, the requester is provided with an authentication experience regardless of whether or not the requester provided a valid identity or an invalid identity. This makes it more difficult to discern whether or not the requester provided an invalid identity, thereby making it more difficult and impractical to perform a brute force attack to identify valid identities within the realm.

To make it even more difficult for the requester to distinguish between an authentication experience when providing a valid identifier and an authentication experience when providing an invalid identifier, the authentication process may further provide timing consistency, a deterministic authentication methodology on a per identifier basis, and proportionate results that are consistent with the relative proportion of valid direct authentication identities and valid federated authentication identities. Each of these further measures will now be described in further detail.

As for timing consistency, the method 400 may be applied such that the time taken to present the direct authentication interface (act 411) or the federated authentication interface (act 412) may be approximately the same amount of time regardless of whether the identity is a valid identity ("Valid" in decision block 420), or an invalid identity ("Invalid" in decision block 420). This makes it more difficult to determine, based on timing of the response, whether the provided identity is valid or invalid.

As for providing a deterministic authentication methodology on a per identifier basis, the pseudo random process (act 421) deterministically results in the same determination as to authentication (e.g., "Direct" in decision block 440 or "Indirect" in decision block 440) given a particular identifier.

Figure 5:
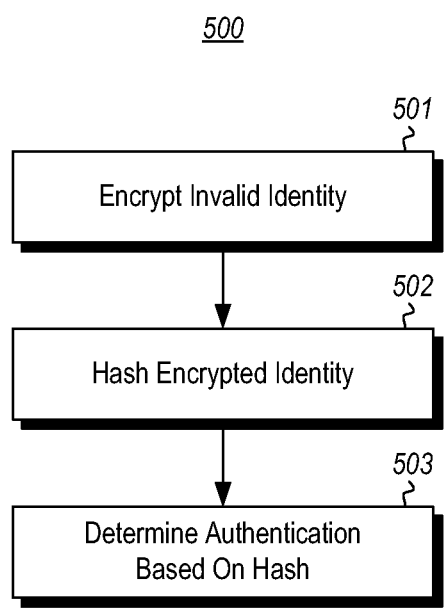
FIG. 5 illustrates a flowchart of a method for applying the pseudo-random process of FIG. 4 deterministically.

This may be accomplished by hashing the invalid identifier, and identifying the proper authentication based on the hash value. To provide further security, FIG. 5 illustrates a flowchart of a method 500 in which the invalid identifier is first encrypted (act 501). Then, the encrypted identifier is hashed (act 502). Furthermore, it is the hashed version of the encrypted identifier that is then used to deterministically identify whether to provide the direct authentication interface ("Direct" in decision block 440) or to provide the federated authentication interface ("Federated" in decision block 440) to the client. In some embodiments, the encryption key used to encrypt the invalid identifier may be global, or perhaps associated with multiple realms. However, to further improve security, and guard against harm should an encryption key be discovered, the encryption key may be specific to the realm.

As for proportionality of the result, the pseudo random process may be applied in a manner that the proportion of the determinations between the direct and federated authentication interface that is approximately the same as the proportion the number of the valid identities in the realm that are to be authenticated by direct authentication to the number of valid identities in the realm that are to be authenticated by federated authentication.

For instance, referring to FIG. 3, suppose that there are six thousand valid direct authentication identities within the realm 302, and two thousand valid federated authentication identities within the realm 302. This means that approximately one fourth of the valid identifies in the realm 302 are federated authentication identities. The pseudo random process could be applied such that one fourth of the invalid identities that technically satisfy the membership criteria of the realm 302 are also having federated authentication applied ("Federated" in decision block 440). Thus, regardless of whether the identifier is valid or invalid, the same proportion of federated authentications are experienced, making it more difficult to ascertain likelihood that an identifier is valid or invalid based on the proportion of federated versus direct authentications.

The following is an example pseudo code sequence in which direct or federated authentication is identified as applying to an incoming service request. Each portion of the pseudo code will be explained in sequence. In the example below, the realms are particular namespaces, in which the membership criteria is simply that the identity be within the namespace.

```
if (IsFederatedNamespace(username.Domain))
{
    RedirectToAdfs(username);
}
```

The above checks whether the namespace is a federated namespace (an example of which being realm 303 in FIG. 3, and reference "Federated" in decision block 402 of FIG. 4). In that case, the code RedirectToAdfs(username) causes the federated authentication interface to be presented to the user (reference act 412).

```
else if (IsDirectNamespace(username.Domain))
{
    RedirectToCloudAuthNPlatform(username);
}
```

The above checks whether the namespace is a direct namespace (an example of which being realm 301 in FIG. 3, and reference "Direct" in decision block 402 of FIG. 4). In that case, the code RedirectToCloudAuthNPlatform(username) causes the direct authentication interface to be presented to the user (reference act 411).

```
else
{
    // Always compute hashed-encryption to avoid timing attacks
    BigInt hash = H(E(username, GetKey(username.Domain)));
    double federatedToDirectRatio =
    GetFederatedToDirectRatio(username.Domain);
    BigInt threshold = Round(federatedToDirectRatio * 2^256);
    bool simulateFederated = hash < threshold;
```

Here, the variable "hash" is of type BigInt (an arbitrarily large integer) which is created by hashing the encrypted form of the identifier. This is performed regardless of whether the identifier is a valid identifier or not. This allows for the timing to be relatively the same regardless of whether the identifier is valid or invalid, providing the timing consistency mentioned above. The threshold variable is used to identify the proportion of federated to direct authentication identities in the namespace, and is later used to ensure a matching proportion of federated and direct authentication experiences are provided for invalid identities also, as mentioned above. Further, the use of hashing ensures that the same invalid identity is deterministically mapped to the same type of authentication experience for each service request.

```
if (DoesUserExist(username))
{
    if (IsFederatedUser(username))
    {
        RedirectToAdfs(username);
    }
}
```

The above determines whether the identifier is valid (decision block 420). If the identifier is valid ("Yes" in decision block 430), and the identity is a federated authentication identity (IsFederatedUser(username) would be true), the federated authentication interface is provided to the user (by calling RedirectToAdfs(username)).

```
else
{
    RedirectToCloudAuthNPlatform(username);
}
```

If the valid identifier is a direct authentication identity (IsFederatedUser(username) would be false, thus this code follows the "else" statement), the direct authentication interface is provided to the user (by calling RedirectToCloudAuthNPlatform(username)).

```
else
{
    if (simulateFederated)
    {
        RedirectToAdfs(username);
    }
```

The above follows the "else" statement that checks the validity of the identifier, and thus would be run if the identifier is invalid ("Invalid" in decision block 420). In this case, the identifier is checked against the Boolean simulateFederated, which is true in approximate proportion of the ratio of valid federated authentication identities to all valid authentication identities. Thus, this code would assign the federated authentication interface deterministically (due to the hashing algorithm) and proportionately to the invalid identities as well ("Federated" in decision block 440).

```
else
{
    RedirectToCloudAuthNPlatform(username);
}
}
```

The above follows the "else" statement in which the identifier is invalid ("Invalid" in decision block 420) and in which the assigned authentication is to be the direct authentication interface ("Direct" in decision block 440). Thus, this code would assign the direct authentication interface deterministically (due to the hashing algorithm) and proportionately to the invalid identities as well.

Accordingly, the principles provided herein provide for a secure mechanism to applying direct or federated authentication in a mixed authentication realm. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product comprising one or more hardware storage devices having thereon computer-executable instructions that are structured such that, when executed by one or more processors of a computing system, cause an application to perform a method for authenticating identities within a mixed realm in which some identities are authenticated using direct authentication, and some identities are authenticated using federated authentication, the method comprising:
    an act of receiving a request for service from an identity within a mixed authentication realm;
    an act of determining whether the identity is a valid identity within the realm; and
        when the identity is determined to be valid and the identity is a direct authentication identity, an act of responding to the request for service with a direct authentication interface, the direct authentication interface enabling entry of a direct authentication credential for the identity;
        when the identity is determined to be valid and the identity is a federated authentication identity, an act of responding to the request for service with a federated authentication interface, the federated authentication interface enabling entry of a federated authentication credential for the identity; or
        when the identity is determined to be invalid:
            an act of pseudo-randomly choosing either the direct authentication interface or the federated authentication interface, including, for each of such requests for service from invalid identities:
                an act of encrypting the invalid identity; and
                an act of hashing the encryption of the invalid identity; and
                an act of determining whether to respond with the direct authentication interface or the federated authentication interface based on the hash result of the invalid identity; and
            an act of responding to the request for service with the pseudo-randomly chosen direct authentication interface or federated authentication interface, the pseudo-randomly chosen direct authentication interface or federated authentication interface enabling entry of a credential for the identity.

2. The computer program product in accordance with claim 1, wherein the method is performed by a service provider or application.

3. The computer program product in accordance with claim 2, wherein the federated authentication interface prompts a user to negotiate authentication with a third-party identity provider to receive credentials that may then be provided back to the service provider or application.

4. The computer program product in accordance with claim 3, wherein the third-party identity provider is an enterprise identity provider.

5. The computer program product in accordance with claim 3, wherein the third-party identity provider is a consumer identity provider.

6. The computer program product in accordance with claim 1, wherein each of the three acts of responding take approximately the same amount of time.

7. The computer program product in accordance with claim 1, wherein the act of pseudo-randomly choosing either the direct authentication interface or the federated authentication interface results in the same determination for any given invalid entity each time a request is made on behalf of the invalid identity.

8. A method, implemented at a computer system that includes one or more processors, for authenticating identities within a realm in which some identities are authenticated using direct authentication, and some identities are authenticated using federated authentication, the method comprising:
    an act of the computer system receiving a first request for service associated with a first identity in a mixed authentication realm;
    an act of the computer system determining that the first identity is a valid identity within the mixed authentication realm and is one of a plurality of identities in the mixed authentication realm that are to be authenticated by direct authentication;
    an act of the computer system responding to the first request for service with a direct authentication interface, the direct authentication interface enabling entry of a direct authentication credential for the first identity;
    an act of the computer system receiving a second request for service associated with a second identity in the mixed authentication realm;
    an act of the computer system determining that the second identity is a valid identity within the mixed authentication realm and is one of a plurality of identities in the mixed authentication realm that are to be authenticated by federated authentication;
    an act of the computer system responding to the second request for service with a federated authentication interface, the federated authentication interface enabling entry of a federated authentication credential for the second identity;
    an act of the computer system receiving a third request for service associated with a third identity in the mixed authentication realm;
    an act of the computer system determining that the third identity is not a valid identity within the mixed authentication realm;
    an act of the computer system pseudo-randomly determining whether to respond with the direct authentication interface or the federated authentication interface, including, for each of such requests for service from invalid identities:
        an act of encrypting the invalid third identity; and
        an act of hashing the encryption of the invalid third identity; and
        an act of determining whether to respond with the direct authentication interface or the federated authentication interface based on the hash result of the invalid third identity; and
    an act of the computer system responding to the third request for service with the pseudo-randomly determined authentication interface, the pseudo-randomly determined authentication interface enabling entry of a credential for the third entity.

9. The method in accordance with claim 8, wherein the act of responding to the first request, the act of responding to the second request, and the act of responding to the third request each take approximately the same amount of time.

10. The method in accordance with claim 9, wherein the act of pseudo-randomly determining whether to respond with the direct authentication interface or the federated authentication interface results in the same determination each time a request is made on behalf of the third identity.

11. The method in accordance with claim 10, wherein the act of pseudo-randomly determining whether to respond with the direct authentication interface or the federated authentication interface results in an aggregated proportion of determination that is approximately the same as a proportion the number of the plurality of identities in the realm that are to be authenticated by direct authentication to the number of the plurality of identities in the realm that are to be authenticated by federated authentication.

12. The method in accordance with claim 8, wherein the act of responding to the first request, the act of responding to the second request, and the act of responding to the third request take approximately the same amount of time such that it cannot be inferred based on the timing of the response whether the identity is a valid identity or an invalid identity.

13. The method in accordance with claim 8, wherein the act of pseudo-randomly determining whether to respond with the direct authentication interface or the federated authentication interface results in the same determination each time a request is made on behalf of the third identity.

14. The method in accordance with claim 8, wherein the act of encrypting is performed using an encryption key that is not specific to the realm.

15. The method in accordance with claim 8, wherein the act of encrypting is performed using an encryption key that is specific to the realm.

16. The method in accordance with claim 8, wherein the act of pseudo-randomly determining whether to respond with the direct authentication interface or the federated authentication interface results in an aggregated proportion of determination that is approximately the same as a proportion the number of the plurality of identities in the realm that are to be authenticated by direct authentication to the number of the plurality of identities in the realm that are to be authenticated by federated authentication.

17. A computer system, comprising:
one or more processors; and
one or more computer-readable media having stored thereon computer-executable instructions that are structured such that, when executed the one or more processors, cause an application to authenticate identities within a mixed realm in which some identities are authenticated using direct authentication, and some identities are authenticated using federated authentication, including the following:
receiving a request for service from an identity within a mixed authentication realm;
determining whether the identity is a valid identity within the realm; and
when the identity is determined to be valid and the identity is a direct authentication identity, responding to the request for service with a direct authentication interface, the direct authentication interface enabling entry of a direct authentication credential for the identity;
when the identity is determined to be valid and the identity is a federated authentication identity, responding to the request for service with a federated authentication interface, the federated authentication interface enabling entry of a federated authentication credential for the identity; or
when the identity is determined to be invalid:
pseudo-randomly choosing either the direct authentication interface or the federated authentication interface, including, for each of such requests for service from invalid identities:
an act of encrypting the invalid identity; and
an act of hashing the encryption of the invalid identity; and
an act of determining whether to respond with the direct authentication interface or the federated authentication interface based on the hash result of the invalid identity; and
responding to the request for service with the pseudo-randomly chosen direct authentication interface or federated authentication interface, the pseudo-randomly chosen direct authentication interface or federated authentication interface enabling entry of a credential for the identity.

* * * * *